United States Patent [19]

Delaney

[11] 4,300,751

[45] Nov. 17, 1981

[54] FOLDABLE AND HEIGHT ADJUSTABLE OVERHEAD LIFT

[76] Inventor: Bennie F. Delaney, Route 3, Box 129, Rusk, Tex. 75785

[21] Appl. No.: 184,334

[22] Filed: Sep. 5, 1980

[51] Int. Cl.³ .................................................. B60P 1/00

[52] U.S. Cl. ....................................... 254/2 R; 414/11

[58] Field of Search .......................... 414/11, 509, 590; 254/2 R, 2 B, 2 C, 3 R, 3 B, 3 C, 4 R, 4 B, 4 C, DIG. 1; 269/17, 63, 64, 70, 71; 298/359 H, 291, 278; 403/359, 97, 196

[56] References Cited

U.S. PATENT DOCUMENTS

| | | | |
|---|---|---|---|
| 1,093,405 | 4/1914 | Hallen | 254/DIG. 1 |
| 2,165,095 | 7/1939 | Frechette | 254/2 B X |
| 2,976,033 | 3/1961 | Martin | 269/70 X |
| 3,049,243 | 8/1962 | Buice | 254/2 R |
| 3,087,630 | 4/1963 | Karnow et al. | 414/590 |
| 3,221,900 | 12/1965 | Love | 414/11 |
| 3,365,080 | 1/1968 | Crull | 414/11 |
| 3,394,933 | 7/1968 | Benoit | 254/4 R X |
| 4,120,484 | 10/1978 | Zimmer | 414/11 |
| 4,186,905 | 2/1980 | Brudy | 403/97 |

*Primary Examiner*—Robert C. Watson
*Attorney, Agent, or Firm*—Harvey B. Jacobson

[57] ABSTRACT

A lower horizontally elongated base frame is provided and includes depending support wheels. An upright longitudinally extendable boom has its lower end pivotally supported from one end of the base frame centrally intermediate the opposite sides thereof for adjusted angular displacement of the boom relative to the frame about a first horizontal transverse axis extending transversely of the frame and the boom between an upright position and a lower horizontal position closely overlying the frame and with the free end of the boom projecting toward the second end of the frame. A second upper horizontal frame is provided and is pivotally supported from the upper end of the boom for adjusted angular displacement of the second frame relative to the boom about a second horizontal axis generally paralleling the first axis between a first position with the second frame disposed at generally right angles relative to the boom and a second position with the second frame generally paralleling the boom. The second frame includes horizontally aligned, upwardly facing and horizontally spaced apart support portions spring mounted therefrom. The boom comprises an extendible fluid cylinder including one end portion supported from the lower frame and a second upper end portion from which the upper frame is supported. A hydraulic pump is supported from the lower frame and is operatively connected to the boom for selective extension and retraction thereof.

6 Claims, 5 Drawing Figures

FIG. 3
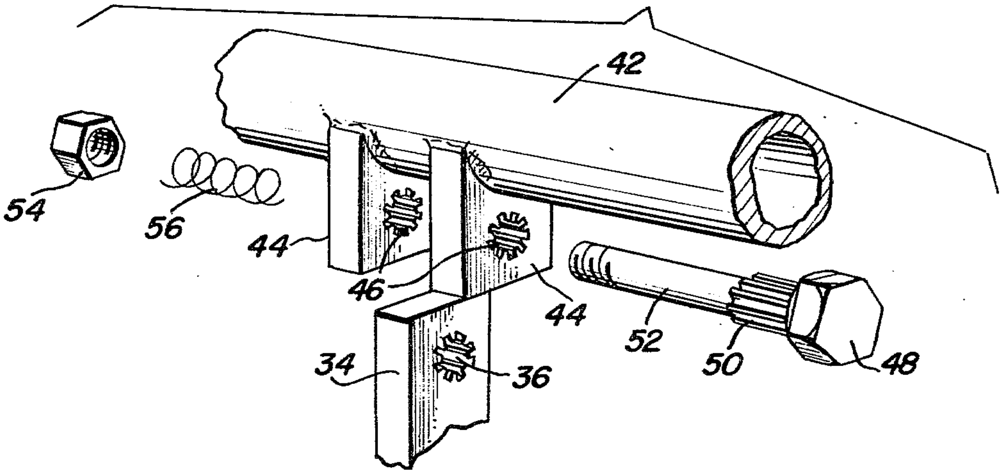
FIG. 4
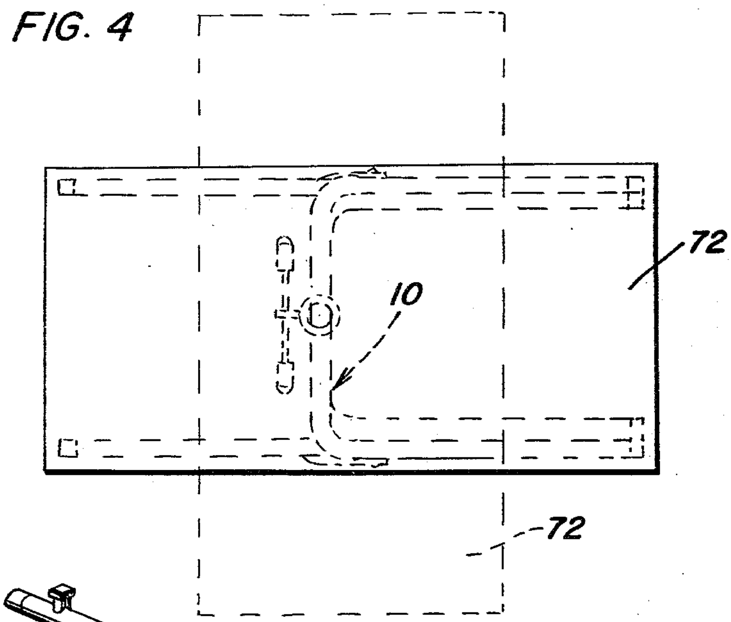
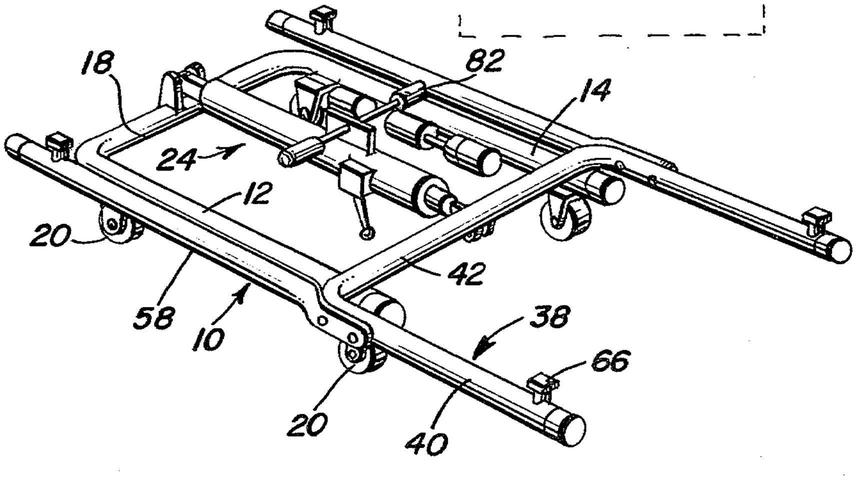
FIG. 5

FOLDABLE AND HEIGHT ADJUSTABLE OVERHEAD LIFT

BACKGROUND OF THE INVENTION

Various work environments, such as the installation of overhead plasterboard panels, require the use of overhead lifts. While various forms of suitable overhead lifts heretofore have been provided for assisting in the installation of overhead plasterboard panels, most of these lifts are quite large, cumbersome and cannot be broken down, folded or otherwise reduced to a compact package for transportation to and from a work site or between remote work sites. Accordingly, a need exists for an improved overhead lift which will be operative to gently support overhead ceiling panels and the like and yet which may be readily reduced to a compact state for ease in transport and storage.

Examples of previously known forms of overhead supports including some of the general structural and operational features of the instant invention are disclosed in U.S. Pat. Nos. 1,606,101, 2,815,132, 2,828,870, 2,939,590 and 3,967,738.

BRIEF DESCRIPTION OF THE INVENTION

The overhead lift of the instant invention includes lower and upper horizontal frame portions between which an elongated extendible boom is mounted and the lower end of the boom is pivotably supported from the lower frame while the upper frame is pivotally from the upper end of the boom. The pivot structure connecting the lower end of the boom to the lower frame is operative to releasably maintain the boom in adjusted inclined positions relative to the lower frame and the pivot structure attaching the upper frame to the upper end of the boom is operative to releasably retain the upper frame in adjusted angular positions relative to the upper boom end. The axes of angular displacement of the lower end of the boom relative to the lower frame and the upper frame relative to the upper end of the boom generally parallel each other and the lift may be collapsed to a position with the boom, in a retracted position, closely overlying the lower frame and the upper frame closely overlying the boom.

The boom comprises an elongated extendible hydraulic cylinder and a hydraulic pump is supported from the lower frame and operatively connected to the cylinder for effecting extension and retraction thereof. Further, the upper frame includes upwardly facing spring mounted horizontally spaced apart support portions from which a ceiling panel may be supported. The hoist includes depending support wheels carried by the lower frame whereby the hoist may be moved as desired over a horizontal surface in proper position in order to elevate a supported ceiling panel into precise position relative to a ceiling structure being erected.

The main object of this invention is to provide a hoist specifically designed to facilitate overhead support of large panels.

Yet another object of this invention is to provide an overhead lift which is adjustable in height and includes depending support wheels enabling it to move into any position upon a horizontal surface beneath a panel supported from the upper portion of the lift.

A still further object of this invention is to provide an overhead lift including an extendible hydraulic lift cylinder and with a hydraulic pump remotely disposed relative to the cylinder for actuation thereof from a remote location.

A final object of this invention to be specifically enumerated herein is to provide an overhead lift in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an enlarged fragmentary exploded perspective view of the pivot connection between the upper boom end of the lift and the upper frame thereof;

FIG. 4 is a top plan view of the lift in use supporting a ceiling panel thereof; and FIG. 5 is a perspective view of the lift in a folded position.

DETAILED DESCRIPTION OF THE INVENTION

Figure 1:
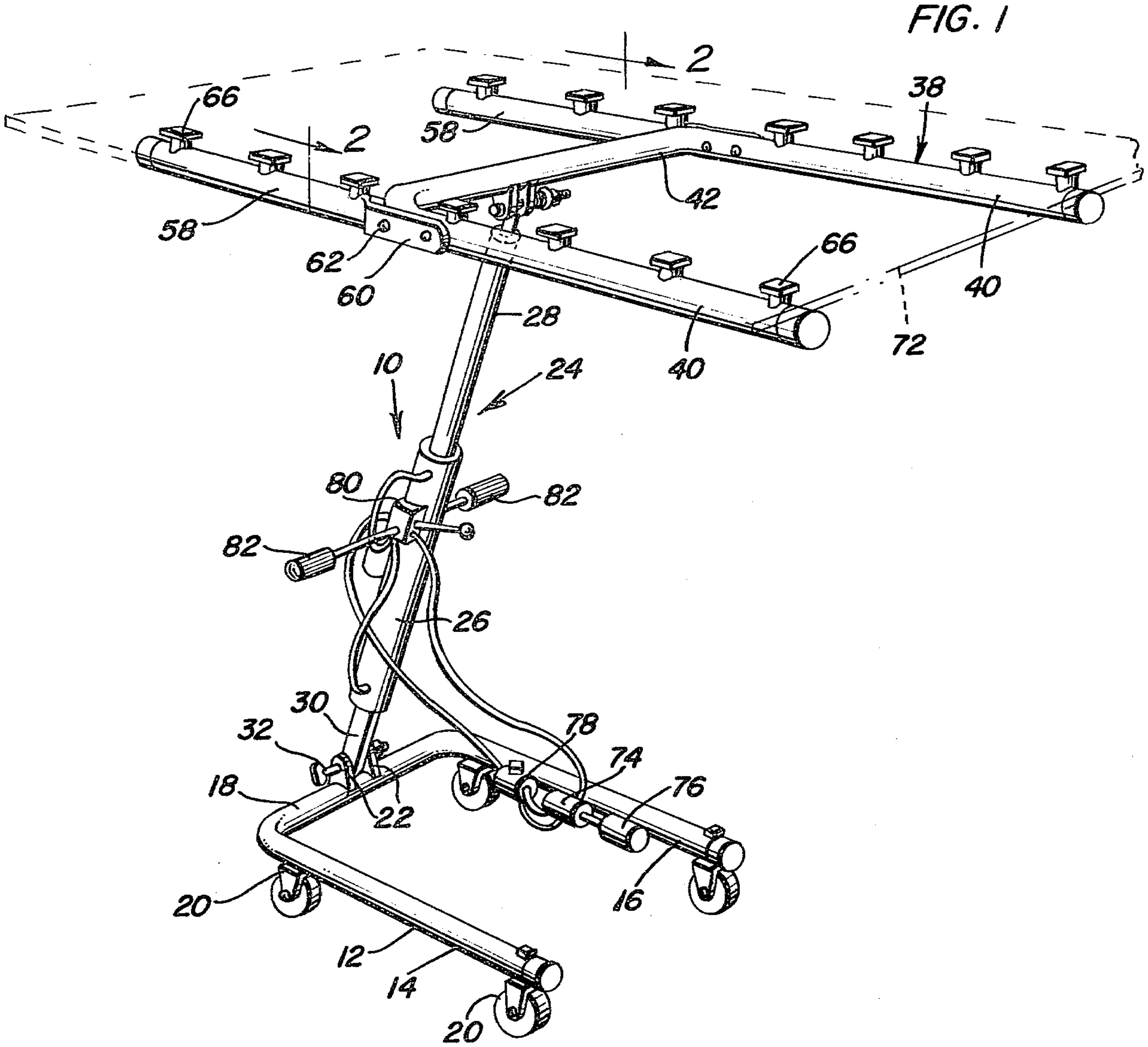
FIG. 1 is a perspective view of the overhead lift of the instant invention.
Figure 2:
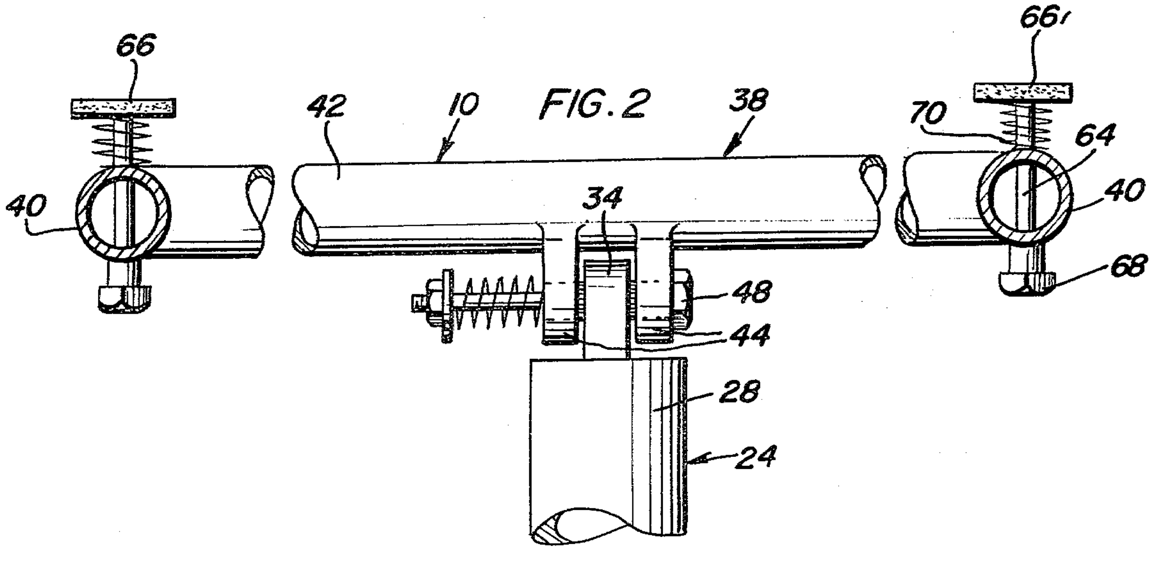
FIG. 2 is a fragmentary enlarged vertical sectional view taken substantially upon the plane indicated by the section line 2—2 of Figure.

Referring now more specifically to the drawings, the numeral 10 generally designates the overhead lift of the instant invention. The lift 10 includes a lower horizontal frame 12 including a pair of opposite side longitudinal members 14 and 16 interconnected at one pair of corresponding ends by a transverse member 18 extending and secured therebetween. The opposite ends of the longitudinal members 14 and 16 include depending caster wheel assemblies 20 and the central portion of the transverse member 18 includes a pair of upstanding flanges 22 having registered apertures formed therethrough. The lift 10 includes an elongated hydraulic cylinder assembly referred to in general by the reference numeral 24 and the assembly 24 includes a lower cylinder portion 26 and an upper piston rod portion 28 telescopingly engaged with the cylinder portion 26. The lower end of the cylinder portion 26 includes a depending mounting shank 30 having a transverse aperture formed therethrough registered with the apertures formed in the flange 22 and a fastener 32 is secured through the flanges 22 and the mounting shank 30 in a manner which will be more clearly defined hereinafter.

The upper end of the piston rod portion 28 includes an upstanding mounting flange 34 having a splined aperture 36 formed therethrough and an upper frame referred to in general by the reference number 38 is provided and includes a pair of longitudinal opposite side members 40 interconnected at one pair of corresponding ends by a transverse member 42 extending and connected therebetween. The transverse member 42 includes a pair of depending horizontally spaced apart flanges 44 having splined apertures 46 formed therethrough corresponding to the aperture 36 and a pivot fastener 48 including an enlarged and splined end 50 is removably passed through the apertures 46 and 36 and has its diametrically reduced and externally threaded end 52 secured through the apertures 36 and 46 by a threaded nut 54, a coil spring 56 being disposed on the diametrically reduced end 52 inwardly of the nut 54 and between the latter and the adjacent flange 44. Of course, the interengagement of the splined end portion 50 of the fastener 48 through the splined apertures 36 and 46 locks the upper frame 38 against angular displacement relative to the cylinder assembly 24. However, the diametrically reduced end 52 is of sufficient length whereby the splined end portion 50 of the fastener 48 may be retracted, against the biasing action of spring 56, from one of the flanges 44 and the flange 34 while the nut remains threadedly engaged with the diametrically reduced end portion 52. Then, the frame 38 may be adjustably angularly displaced as desired and the fastener 48 may be released whereby the compression spring 56 will again project the splined end portion 50 of the fastener 48 through the aperture 36 and the aperture 46 in the flange 44 against which the spring 56 bears. At this point, it is pointed out that the pivot connection immediately above discussed in connection with the upper end of the cylinder assembly 24 and the frame 38 is substantially identical to the pivot connection defined between the lower end of the cylinder assembly 24 and the flanges 22, the fastener 32 being equivalent to the fastener 48.

The upper frame 38 includes a pair of opposite side extension arms 58 supported from the ends of the longitudinal members 40 adjacent the transverse member 42. Each of the arms 58 is pivotally attached to the corresponding longitudinal member 40 by a pivot fastener 60 and releasably retained in position relative to the corresponding longitudinal member 40 by a removable fastener 62. When the removable fastener 62 is removed, the extension arms 58 may be swung 180° from their positions illustrated in FIG. 1 in order to closely parallel the longitudinal members 40.

The longitudinal members 40 and extension arms 58 include vertical bores (not shown) formed therethrough through which the lower ends of depending shank portions 64 of upwardly facing support pads 66 are slidingly received. The lower terminal ends of the shank portion 64 are secured through the longitudinal members 40 and extension arms 58 by heads 68 carried by the lower ends of the shank portions 64 and the shank portions 64 include coil springs 70 disposed thereabout between the upper surfaces of the longitudinal members 40 and extension arms 58 and the undersides of the support pads 66 whereby the latter are spring supported from the upper frame 38 for cushioned support of a large ceiling panel 72 therefrom.

A hydraulic pump 74 is supported from one of the longitudinal members 16 of the lower frame 12 and driven by an electric motor 76 coupled thereto and also supported from the corresponding longitudinal member 16. A hydraulic reservoir 78 is further supported from the lower frame 12 and the pump 74, reservoir 78 and cylinder assembly 24 are conventionally interconnected with suitable hydraulic lines and also a manual control 80 supported from the cylinder assembly 24 whereby extension and retraction of the cylinder assembly 24 may be effected from the control 80.

The motor 76, pump 74 and tank 78 are supported from the lower frame 12 in order to maintain as much of the weight of the lift 10 as low as possible. In addition, it will be noted that the cylinder assembly 24 may be inclined so as to maintain the load or panel 72 supported from the frame 38 in substantially centered position over the frame 12, independent of the extended or retracted position of the cylinder assembly 24. Also, the cylinder assembly 24 includes handles 82 whereby the lift 10 may be rolled to a desired position on a suitable support surface.

When the lift 10 is not in use, the cylinder assembly 24 may be fully retracted and swung to a horizontal position thereof such as that illustrated in FIG. 5 of the drawings with the cylinder assembly 24 closely overlying the horizontal plane containing the frame 12. In addition, the frame 38 may be adjustably angularly displaced relative to the piston rod portion 28 of the cylinder assembly 24 and thus be supported in position closely overlying the plane of the frame 12. In this manner, the lift 10 may be collapsed to a very compact state for storage for transport from one location to another.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A foldable and height adjustable overhead lift including a horizontal lower elongated base frame, an upright longitudinally extendible boom, first pivot means supporting a first lower end of said boom from one end of said frame centrally intermediate the opposite sides thereof for selective angular adjustment of said boom relative to said frame about a first horizontal transverse axis extending transversely of said frame and boom between an upright position and a lower horizontal position closely overlying said frame and with the second of said boom projecting toward the second end of said frame, a second horizontal upper frame, second pivot means supporting said upper frame from the second end of said boom for selective angular displacement of said second frame relative to said boom about a second horizontal axis generally paralleling said first axis between a first position with said second frame disposed at generally right angles relative to said boom and a second position with said second frame generally paralleling said boom, said second frame including generally horizontally aligned, upwardly facing and horizontally spaced apart support portions supported therefrom, said first and second pivot means enabling said boom to be positioned in various inclined positions while said base and upper frames are maintained substantially horizontal, said first and second ends of said boom including mounting flange portions provided with parallel horizontal splined bores, said upper and lower frames including pairs of spaced mounting flanges having aligned horizontal splined bores formed therethrough and between which said boom flanges are received with the boom flange bores registered with the corresponding frame flange bores, and a pair of spring biased pivot fasteners each including a first splined end extending through the corresponding splined bores and a second smooth end axially shiftable into at least one of the corresponding frame flange bores and the corresponding cylinder flange bore.

2. The combination of claim 1 wherein said support portions comprise support elements spring mounted to said frame.

3. The combination of claim 1 wherein said lower frame is generally U-shaped in plan including a pair of opposite side longitudinal members interconnected at one pair of corresponding ends by a transverse member extending and connected therebetween, said first pivot means being supported from the midportion of said transverse member.

4. The combination of claim 1 wherein said boom includes first and second relatively extendible lower and upper end portions supported from said lower and upper frames, respectively.

5. The combination of claim 4 wherein said lower frame includes motor means operatively connected to said boom for selectively telescoping said upper end portion relative to said lower end portion.

6. The combination of claim 1 wherein said upper frame includes a main frame portion generally U-shaped in plan including a pair of opposite side longitudinal elements and a horizontal transverse element extending and secured between one pair of corresponding ends of said longitudinal elements, each of said longitudinal elements, adjacent said transverse element, including elongated extension elements supported therefrom and projecting to the opposite side of said transverse elements, said extension element being pivotally supported from said longitudinal elements and releasably securable in 180° relatively angularly displaced positions relative to said longitudinal elements generally paralleling the latter.

* * * * *